(12) United States Patent
Wendt et al.

(10) Patent No.: US 8,330,391 B2
(45) Date of Patent: Dec. 11, 2012

(54) SUPPLY CIRCUIT AND DEVICE COMPRISING A SUPPLY CIRCUIT

(75) Inventors: Matthias Wendt, Wurselen (DE); Heinz Van Der Broeck, Zulpich (DE); Georg Sauerlander, Aachen (DE); Dirk Hente, Wurselen (DE)

(73) Assignee: Koninklijke Philips Electronics N.V., Eindhoven (NL)

( * ) Notice: Subject to any disclaimer, the term of this patent is extended or adjusted under 35 U.S.C. 154(b) by 829 days.

(21) Appl. No.: 12/281,165

(22) PCT Filed: Mar. 2, 2007

(86) PCT No.: PCT/IB2007/050681
§ 371 (c)(1),
(2), (4) Date: Aug. 29, 2008

(87) PCT Pub. No.: WO2007/102106
PCT Pub. Date: Sep. 13, 2007

(65) Prior Publication Data
US 2009/0021175 A1    Jan. 22, 2009

(30) Foreign Application Priority Data

Mar. 6, 2006 (EP) ..................................... 06110730

(51) Int. Cl.
*H05B 37/02* (2006.01)
(52) U.S. Cl. ................. 315/307; 315/200 R; 315/185 R
(58) Field of Classification Search ............... 315/185 R, 315/186, 192, 242, 244, 209 R, 185 S, 217, 315/224, 216, 243, 291, 307, 247; 345/39, 345/46, 82, 83; 363/131, 132, 127, 95, 97, 363/16, 17, 89
See application file for complete search history.

(56) References Cited

U.S. PATENT DOCUMENTS

| | | | |
|---|---|---|---|
| 4,777,427 A | 10/1988 | Kiyohara | |
| 5,323,305 A | 6/1994 | Ikeda et al. | |

(Continued)

FOREIGN PATENT DOCUMENTS

EP    0317698 A1    5/1989

(Continued)

OTHER PUBLICATIONS

S. Chudjuarjeen, et al: "Full-Bridge Current-Fed Inverter with Automatic Frequency Control for Forging Application" TENCON 2004 IEEE Region 10 Conference, vol. D, Nov. 21, 2004, pp. 128-131, XP002447510.

(Continued)

*Primary Examiner* — Jason M Crawford
(74) *Attorney, Agent, or Firm* — Mark L. Beloborodov

(57) ABSTRACT

Supply circuits (1-3,101-102,201-203) for supplying output current signals to loads (6,106,206) and comprising first circuits (1,101,201) with transistors (11-14,111-112,211-212) for converting input voltage signals into pulse signals and comprising second circuits (2,102,202) with resonance circuits for receiving the pulse signals and for supplying the output current signals to the loads (6,106,206) are provided with third circuits (3,203) for controlling the first circuits (1,101,201), which third circuits (3,203) comprise generators (35-37) for generating control signals for controlling the transistors (11-14,111-112,211-212) for reducing dependencies between the input voltage signals and the output current signals. The third circuits (3,203) supply the control signals in dependence of the input voltage signals and independently from the output current signals. The transistors (11-14,111-112,211-212) may form a full bridge, a full bridge operated in a half bridge mode, or a half bridge.

17 Claims, 12 Drawing Sheets

U.S. PATENT DOCUMENTS

Figure 1:
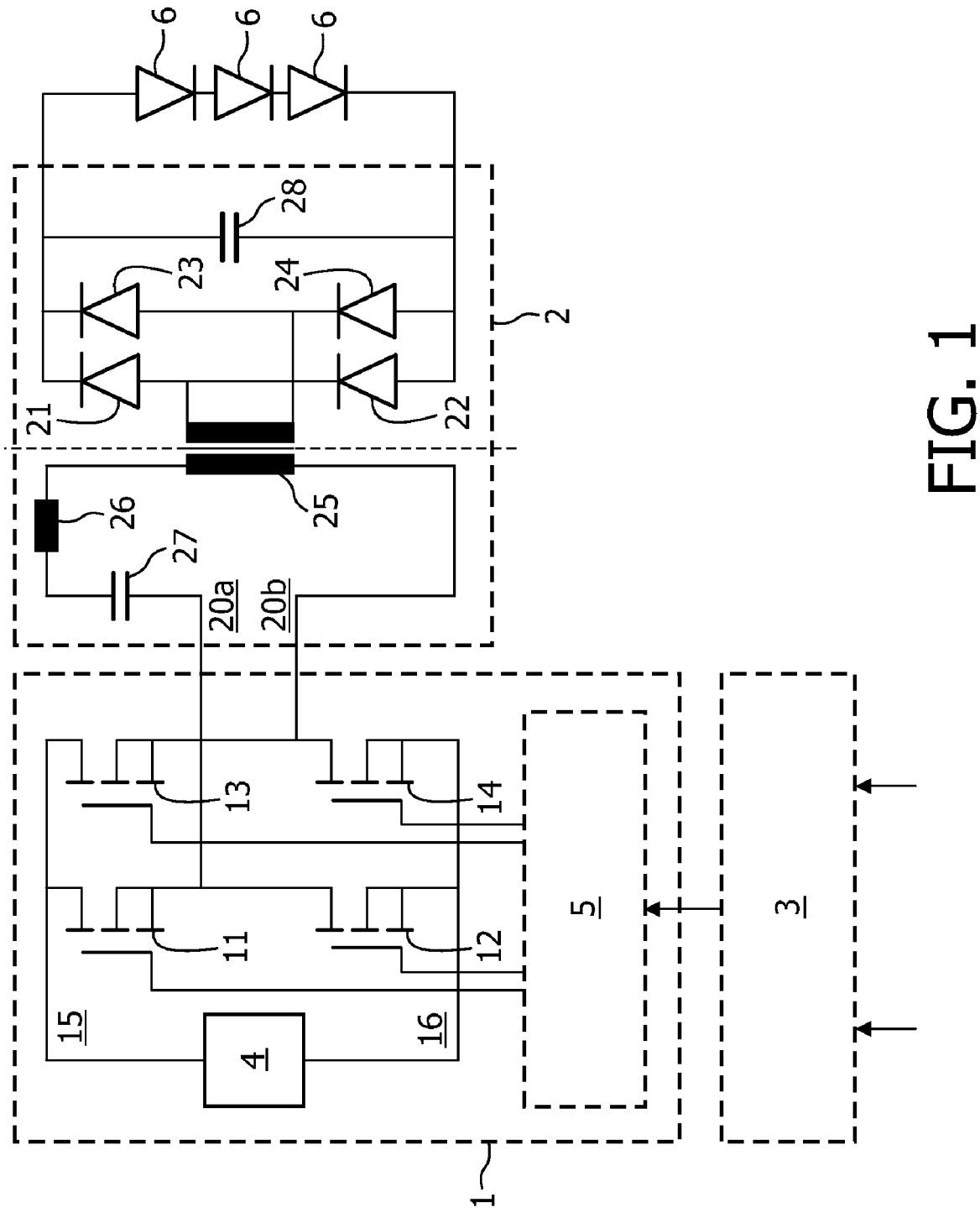

| | | | |
|---|---|---|---|
| 5,914,572 A * | 6/1999 | Qian et al. | 315/307 |
| 6,411,045 B1 | 6/2002 | Nerone | |
| 6,420,858 B1 | 7/2002 | Kitagawa et al. | |
| 6,826,059 B2 | 11/2004 | Bockle et al. | |
| 6,853,150 B2 | 2/2005 | Clauberg et al. | |
| 7,573,729 B2 * | 8/2009 | Elferich et al. | 363/21.02 |
| 2003/0030386 A1 * | 2/2003 | Leeb et al. | 315/291 |
| 2004/0183380 A1 | 9/2004 | Otake et al. | |
| 2005/0073859 A1 | 4/2005 | Fukumoto | |
| 2005/0281061 A1 | 12/2005 | Radecker | |

FOREIGN PATENT DOCUMENTS

| | | |
|---|---|---|
| EP | 1215944 A1 | 6/2002 |
| WO | 0169978 A1 | 9/2001 |
| WO | 03056878 A1 | 7/2003 |
| WO | 2005036726 A1 | 4/2005 |
| WO | 2005048658 A1 | 5/2005 |

OTHER PUBLICATIONS

Heinz Van Der Broeck, et al: Power driver topologies and control schemes for LEDs Cologne Unv. of Applied Sciences, APEC2007 conference in the US, pp. 1-7.

* cited by examiner

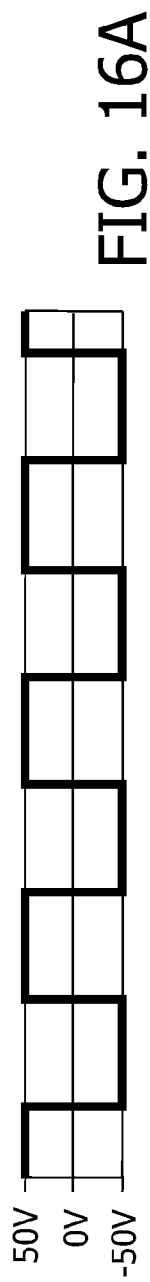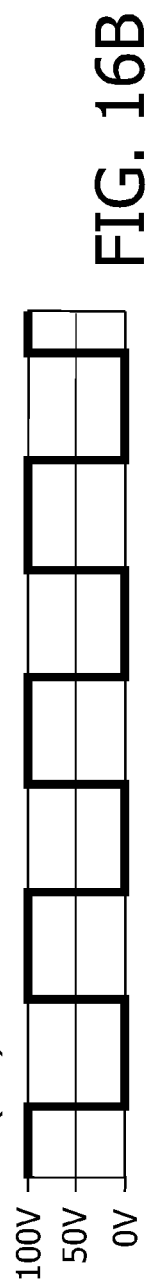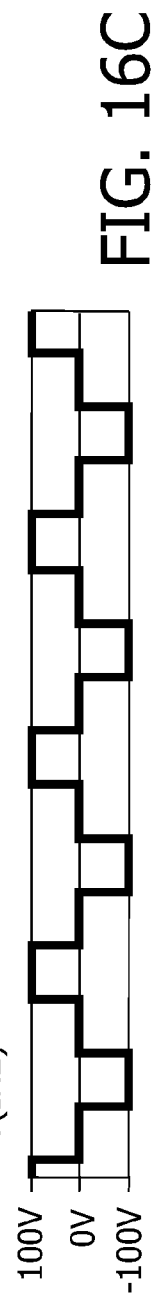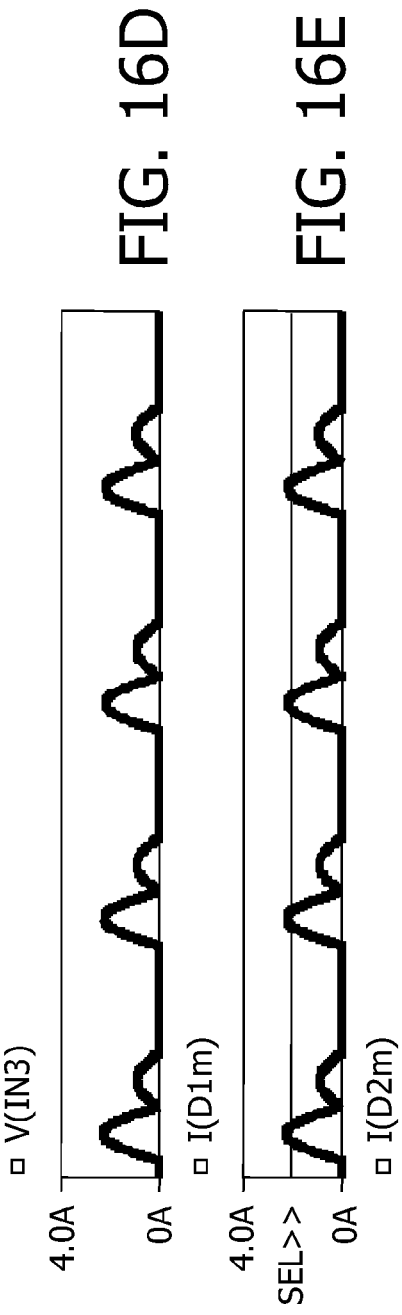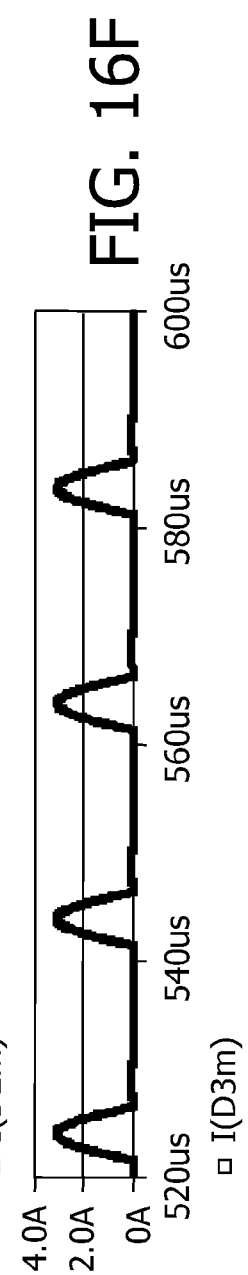
FIG. 16A
FIG. 16B
FIG. 16C
FIG. 16D
FIG. 16E
FIG. 16F

SUPPLY CIRCUIT AND DEVICE COMPRISING A SUPPLY CIRCUIT

The invention relates to a supply circuit for supplying an output signal to a load, and also relates to a device comprising a supply circuit, to a method and to a computer program product and/or a medium for storing the computer program product.

Examples of such a supply circuit are switched mode power supplies, without excluding other supply circuits. Examples of such a load are one light emitting diode and two or more serial light emitting diodes and two or more parallel light emitting diodes, without excluding other loads.

A prior art supply circuit is known from U.S. Pat. No. 6,853,150 B2, which discloses a supply circuit comprising a transistor circuit with two transistors in a half bridge configuration and comprising an impedance circuit with an inductor and capacitors each coupled to light emitting diodes.

The prior art supply circuit is disadvantageous, inter alia, in that a fluctuation in an input signal and/or a fluctuation in a voltage drop across the light emitting diodes may result in a fluctuation in an output signal, which may result in a fluctuation in a brightness of a light emitting diode.

It is an object of the invention, inter alia, to provide a supply circuit that supplies a relatively constant output signal to a load.

Further objects of the invention are, inter alia, to provide a device comprising a supply circuit that supplies a relatively constant output signal to a load, to provide a method for supplying a relatively constant output signal to a load, and to provide a computer program product for supplying a relatively constant output signal to a load.

According to the invention, the supply circuit for supplying an output signal to a load comprises
- a first circuit for converting an input signal into a pulse signal, which first circuit comprises transistors,
- a second circuit for receiving the pulse signal and for supplying the output signal to the load, which second circuit comprises a resonance circuit, and
- a third circuit for controlling the first circuit, which third circuit comprises a generator for generating a control signal for controlling the transistors for reducing a dependency between the input signal and the output signal.

By introducing, in addition to the first circuit and the second circuit, the third circuit for controlling the first circuit, which third circuit comprises the generator for generating the control signal for controlling the transistors in such a way that a dependency between the input signal and the output signal is reduced, the supply circuit according to the invention supplies a relatively constant output signal to a load.

The input signal for example comprises an input voltage signal, without excluding other input signals, and the output signal for example comprises an output current signal, without excluding other output signals.

The supply circuit according to the invention further reduces a dependency between for example an output voltage signal and for example an output current signal.

An embodiment of the supply circuit according to the invention is defined by the third circuit comprising an input for receiving the input signal and comprising an output for supplying the control signal in dependence of the input signal and independently from the output signal. This embodiment advantageously avoids a use of a disadvantageous feedback loop from the load (secondary side) to the first circuit (primary side). In other words, this embodiment supplies the control signal in dependence of a primary side signal and independently from a secondary side signal.

An embodiment of the supply circuit according to the invention is defined by the third circuit comprising a further input for receiving a reference signal, the control signal further depending on the reference signal. This embodiment advantageously allows the output signal to be adjusted by adjusting the reference signal. The reference signal for example comprises a reference current signal, without excluding other reference signals.

An embodiment of the supply circuit according to the invention is defined by the third circuit comprising a multiplier for multiplying the input signal and the control signal and comprising a low pass filter for low pass filtering a multiplier output signal and comprising a converter for converting a low pass filter output signal into a low pass filter output signal and comprising an adder for adding an inverted low pass filter output signal and the reference signal, the generator comprising a controller for receiving an adder output signal and comprising a voltage controlled oscillator for receiving a controller output signal and comprising a monoflop for receiving a voltage controlled oscillator output signal and for generating the control signal. This embodiment advantageously introduces a third circuit comprising a control loop. The addition of the inverted low pass filter output current signal and the reference signal of course corresponds with a subtraction of the low pass filter output signal from the reference signal. The multiplier output signal for example comprises a multiplier output voltage signal, the low pass filter output signal for example comprises a low pass filter output voltage signal before entering the converter and for example comprises a low pass filter output current signal after having left the converter and the adder output signal for example comprises an adder output current signal, without excluding other signals.

An embodiment of the supply circuit according to the invention is defined by the pulse signal comprising first pulses having a first amplitude and comprising second pulses having a second amplitude different from the first amplitude and comprising levels having a third amplitude different from the first and second amplitudes. This embodiment advantageously introduces a pulse signal with three different amplitudes that increase a number of controlling options.

Preferably, the supply circuit according to the invention is defined by the first amplitude being a positive amplitude, the second amplitude being a negative amplitude, and the third amplitude being a substantially zero amplitude. This embodiment advantageously introduces a symmetrical pulse signal.

Preferably, the supply circuit according to the invention is defined by the first circuit comprising a first transistor having a first main electrode coupled to a first reference terminal and having a second main electrode coupled to a first input of the second circuit and comprising a second transistor having a first main electrode coupled to the second main electrode of the first transistor and having a second main electrode coupled to a second reference terminal and comprising a third transistor having a first main electrode coupled to the first reference terminal and having a second main electrode coupled to a second input of the second circuit and comprising a fourth transistor having a first main electrode coupled to the second main electrode of the third transistor and having a second main electrode coupled to the second reference terminal. This embodiment advantageously introduces a first circuit comprising four transistors in a full bridge configuration (H bridge).

Preferably, the supply circuit according to the invention is defined by the first circuit comprising logical circuitry for receiving the control signal and comprising outputs coupled to control electrodes of the transistors for bringing the first and fourth transistors in a conducting state to create the first pulses and for bringing the second and third transistors in a conducting state to create the second pulses and for bringing either the first and third or the second and fourth transistors in a conducting state to create the levels. This embodiment advantageously introduces logical circuitry into the first circuit for coupling the first and third circuits to each other.

An embodiment of the supply circuit according to the invention is defined by the pulse signal comprising first pulses having a first amplitude and comprising second pulses having a second amplitude different from the first amplitude. This embodiment advantageously introduces a pulse signal with only two different amplitudes.

Preferably, the supply circuit according to the invention is defined by the first amplitude being a positive amplitude and the second amplitude being a negative amplitude. This embodiment advantageously introduces a symmetrical pulse signal.

Preferably, the supply circuit according to the invention is defined by the first circuit comprising the four transistor topology described above, which four transistors are operated in such a way that now only a pulse signal with two different amplitudes is introduced. This embodiment advantageously introduces a first circuit comprising four transistors in a full bridge configuration (H bridge) that now introduce a pulse signal with only two amplitudes.

An embodiment of the supply circuit according to the invention is defined by the pulse signal comprising third pulses having a fourth amplitude and comprising a level having a fifth amplitude. This embodiment advantageously introduces a pulse signal with only two different amplitudes, one of these amplitudes being realized by a pulse and the other one of these amplitudes being realized by a level.

Preferably, the supply circuit according to the invention is defined by the fourth amplitude being a positive amplitude and the fifth amplitude being a substantially zero amplitude. This embodiment advantageously introduces an asymmetrical pulse signal.

Preferably, the supply circuit according to the invention is defined by the first circuit comprising a first transistor having a first main electrode coupled to a first reference terminal and having a second main electrode coupled to a first input of the second circuit and comprising a second transistor having a first main electrode coupled to the second main electrode of the first transistor and having a second main electrode coupled to a second reference terminal, which second reference terminal is further coupled to a second input of the second circuit. This embodiment advantageously introduces a first circuit comprising two transistors in a half bridge configuration.

Preferably, the supply circuit according to the invention is defined by the first circuit comprising logical circuitry for receiving the control signal and comprising outputs coupled to control electrodes of the transistors for bringing the first transistor in a conducting state to create the third pulses and for bringing the second transistor in a conducting state to create the levels. This embodiment advantageously introduces logical circuitry into the first circuit for coupling the first and third circuits to each other.

Preferably, the supply circuit according to the invention is defined by the first circuit comprising a half bridge, and the third circuit being arranged to drive the half bridge at Ts≧4*tau, where tau is half a resonance period of the resonance circuit and Ts is a switching period.

Preferably, the supply circuit according to the invention is defined by the first circuit comprising a full bridge, and the third circuit being arranged to drive the full bridge as either a half bridge at an on&off time=2*tau and at Ts≧4*tau or as a full bridge without a free wheel state at an on+&on−time=2*tau and at Ts≧4*tau or as a full bridge with a free wheel state at on+&on−time=tau and free wheel states of length tau following every pulse and Ts≧4*tau, where tau is half a resonance period of the resonance circuit and Ts is a switching period.

An embodiment of the supply circuit according to the invention is defined by the resonance circuit comprising a transformer and a capacitor coupled serially to a primary side of the transformer or to a secondary side of the transformer. This embodiment advantageously introduces the transformer for providing galvanic isolation. Possibly, the second circuit may further comprise a rectifying circuit comprising one or more diodes coupled to a secondary side of the transformer. This embodiment advantageously further introduces the capacitor for in combination with the leakage inductance of the transformer (and/or with a separate inductor) creating a resonant circuit.

An embodiment of the supply circuit according to the invention is defined by the resonance circuit comprising an inductor and a capacitor coupled serially to a primary side of the inductor or to a secondary side of the inductor. This embodiment advantageously introduces the inductor. Such an inductor is more low cost than a transformer. Possibly, the second circuit may further comprise a rectifying circuit comprising one or more diodes coupled to a secondary side of the inductor. This embodiment advantageously further introduces the capacitor for in combination with the inductor creating a resonant circuit.

An embodiment of the supply circuit according to the invention is defined by the load comprising one or more light emitting diodes.

An embodiment of the supply circuit according to the invention is defined by comprising one or more input diodes for rectifying an AC signal, the input signal comprising a rectified AC signal. The AC signal for example comprises an AC voltage signal, without excluding other AC signals.

An embodiment of the supply circuit according to the invention is defined by the pulse signal comprising a pulse having a pulse width substantially equal to half a resonant period of the resonance circuit (full bridge).

An embodiment of the supply circuit according to the invention is defined by the pulse signal comprising pulses having a pulse frequency substantially equal to or smaller than half a resonant frequency of the resonance circuit (full bridge).

An embodiment of the supply circuit according to the invention is defined by a product of the input signal and the pulse frequency being substantially constant. This way, a constant output current signal is generated that is independent from an input voltage signal.

An embodiment of the supply circuit according to the invention is defined by the pulse signal comprising a pulse having a pulse width substantially equal to a resonant period of the resonance circuit (half bridge).

An embodiment of the supply circuit according to the invention is defined by the pulse signal comprising pulses having a pulse frequency substantially equal to or smaller than a resonant frequency of the resonance circuit (half bridge).

An embodiment of the supply circuit according to the invention is defined by a product of the input signal and the pulse frequency being substantially constant. This way, a constant output current signal is generated that is independent from an input voltage signal.

Embodiments of the device according to the invention and of the method according to the invention and of the computer program product according to the invention and/or the medium according to the invention correspond with the embodiments of the supply circuit according to the invention.

The invention is based on the insight, inter alia, that a fluctuation in an input voltage may result in a fluctuation in an output current which is to be avoided, and is based on the basic idea, inter alia, that in addition to the first circuit and the second circuit, the third circuit for controlling the first circuit in such a way that a dependency between the input signal and the output signal is reduced is to be introduced.

The invention solves the problem, inter alia, to provide a supply circuit that supplies a relatively constant output signal to a load, and is further advantageous, inter alia, in that a dependency between for example an output voltage signal and for example an output current signal is reduced.

These and other aspects of the invention will be apparent from and elucidated with reference to the embodiments(s) described hereinafter.

Figure 2:
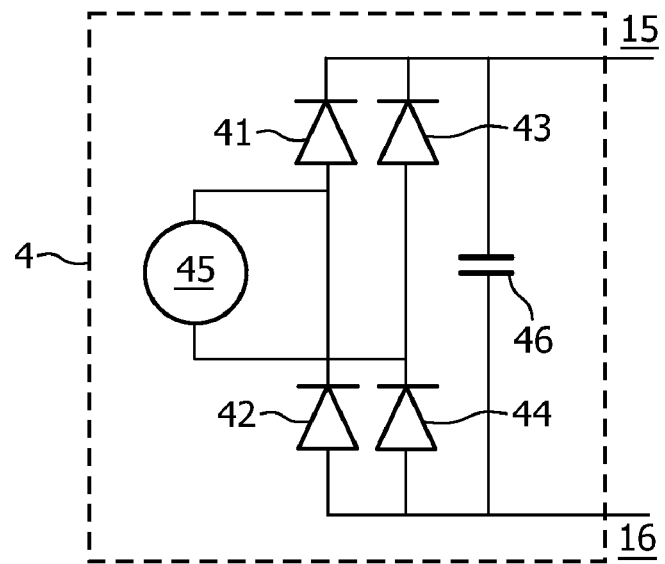
Figure 3:
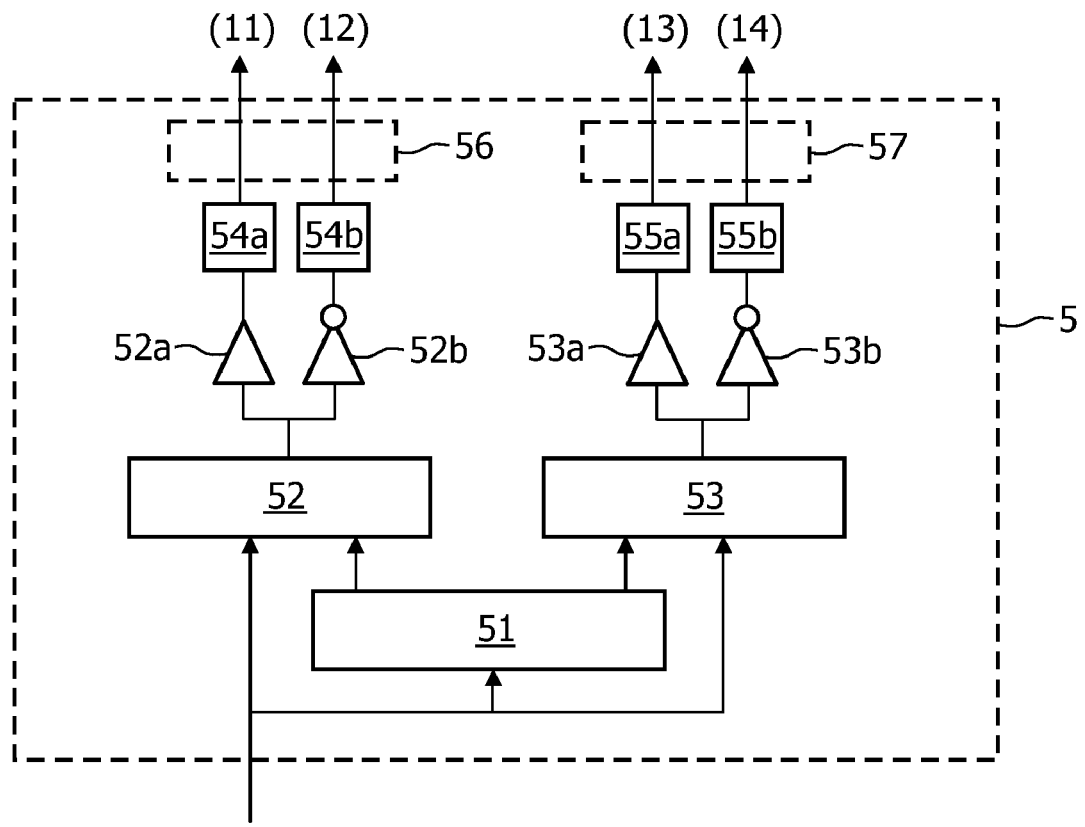
Figure 4:
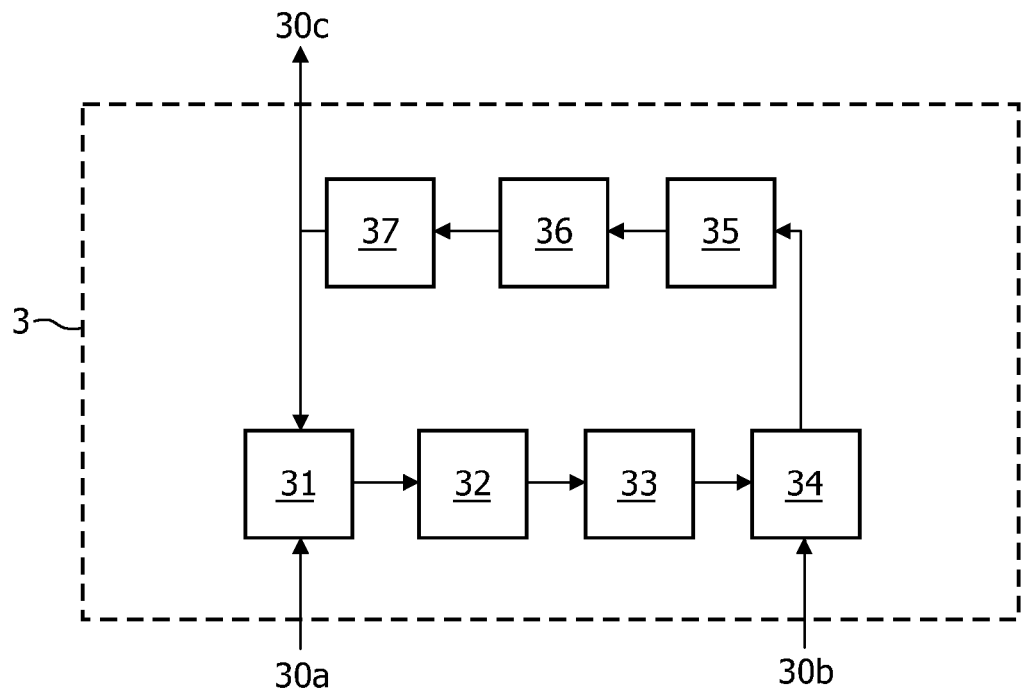
Figure 5:
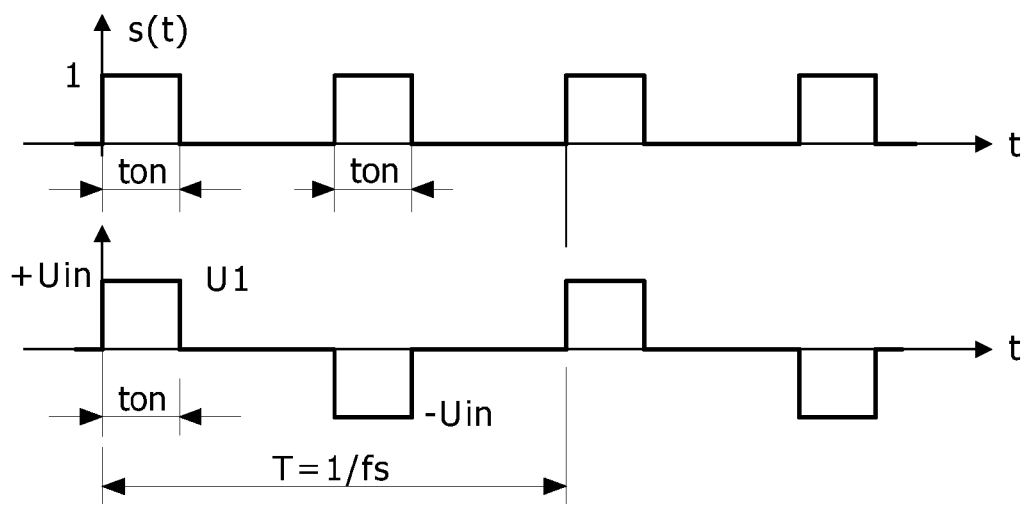
Figure 6:
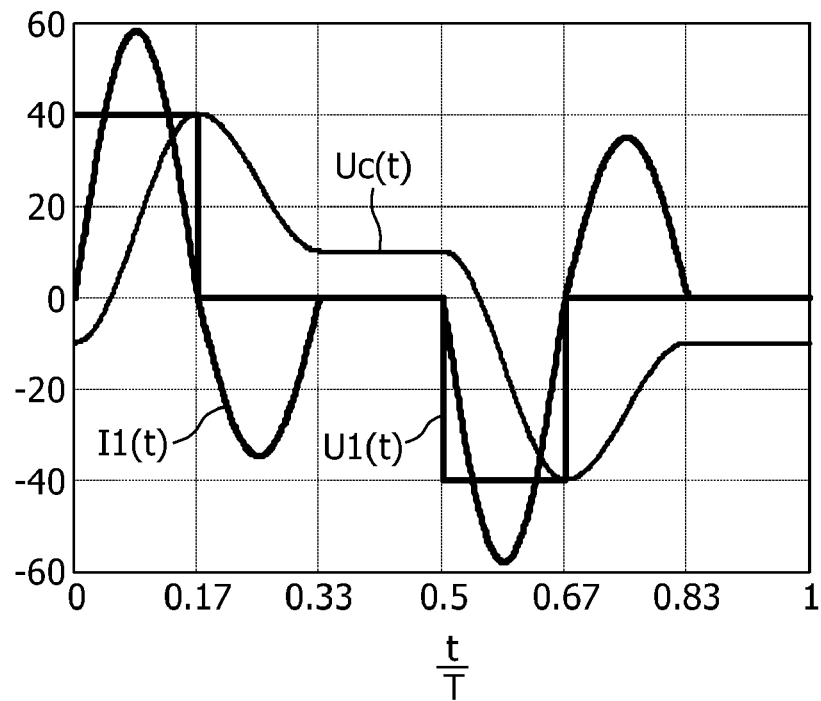
Figure 7:
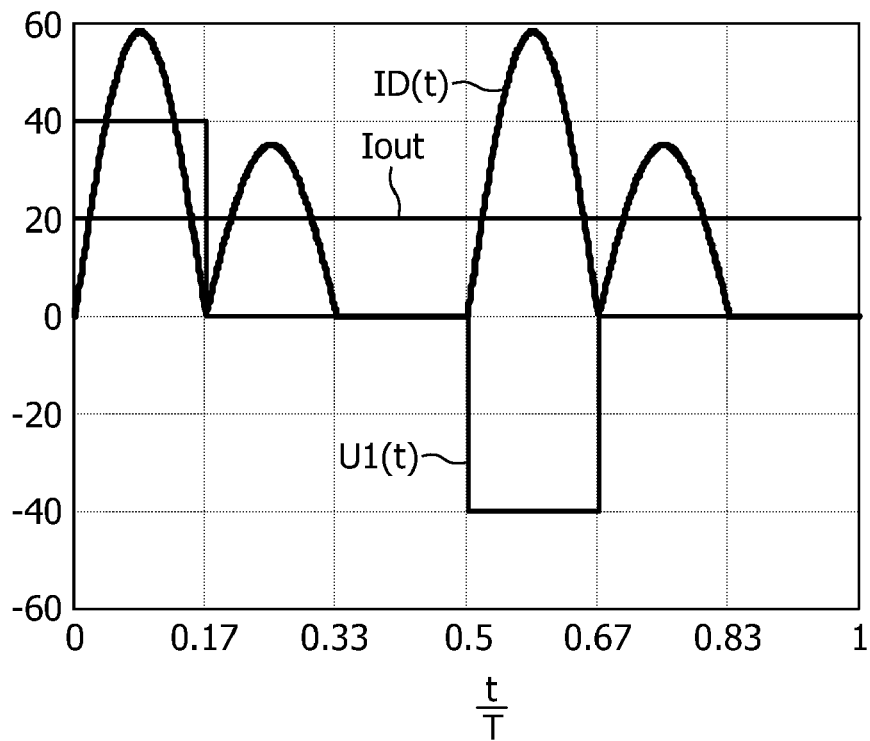
Figure 8:
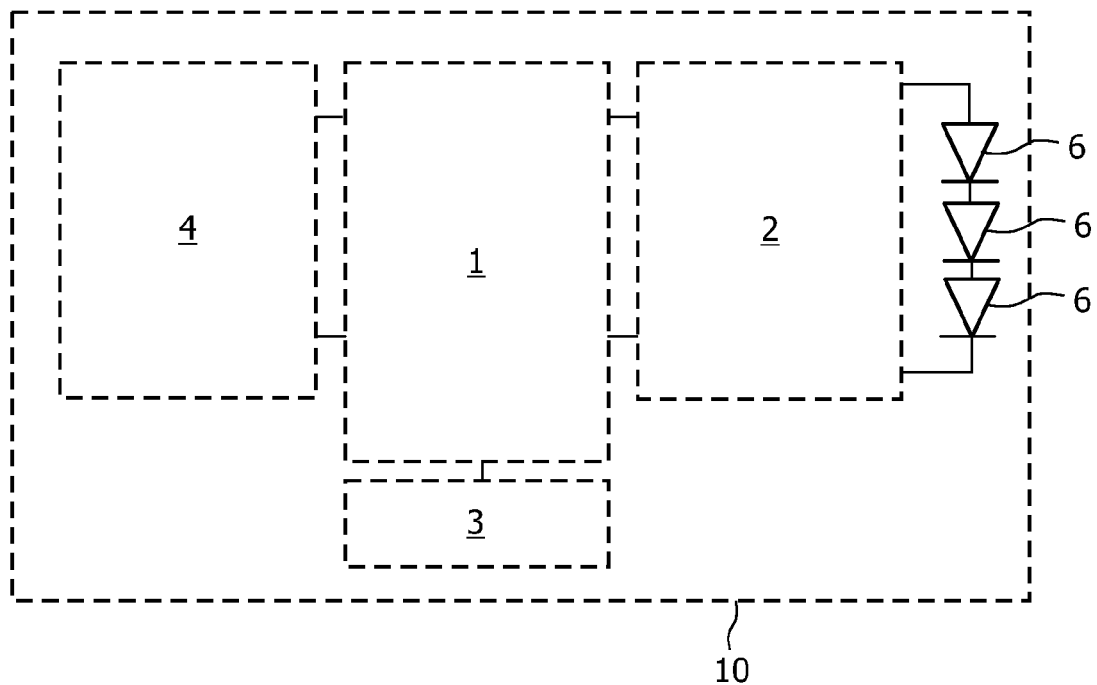
Figure 9:
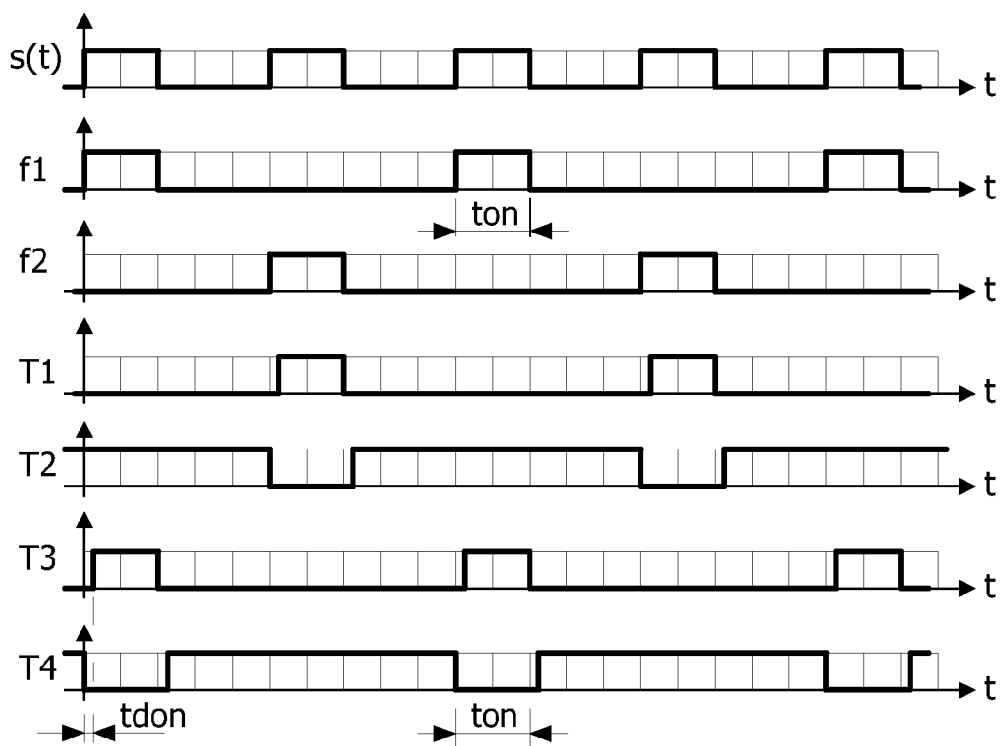
Figure 10:
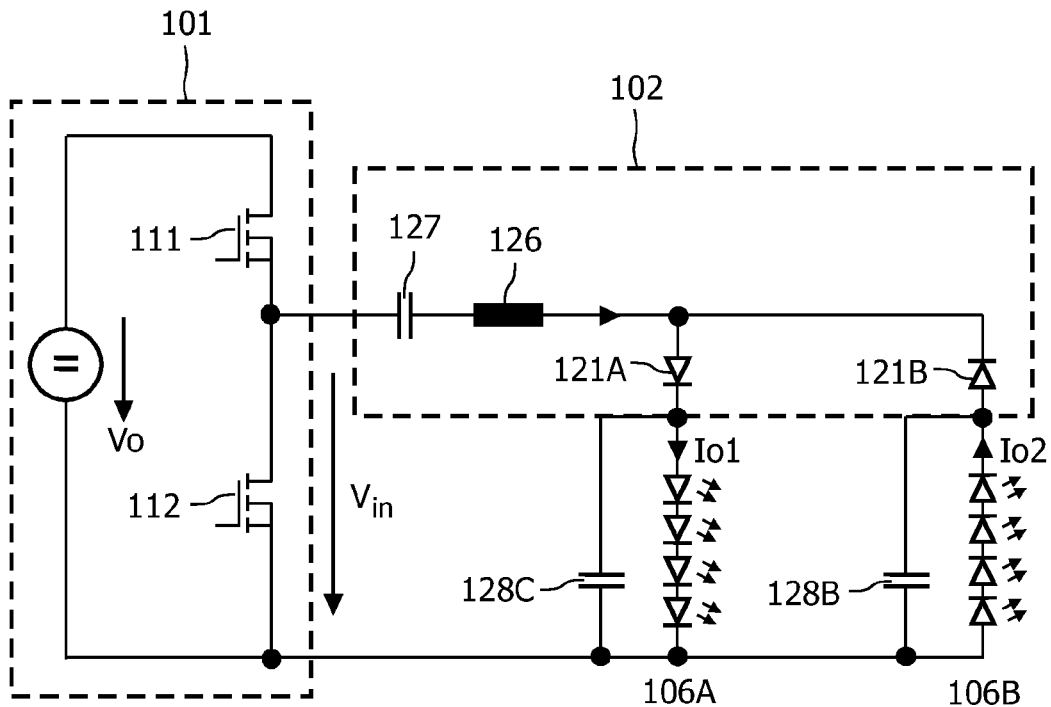
Figure 11:
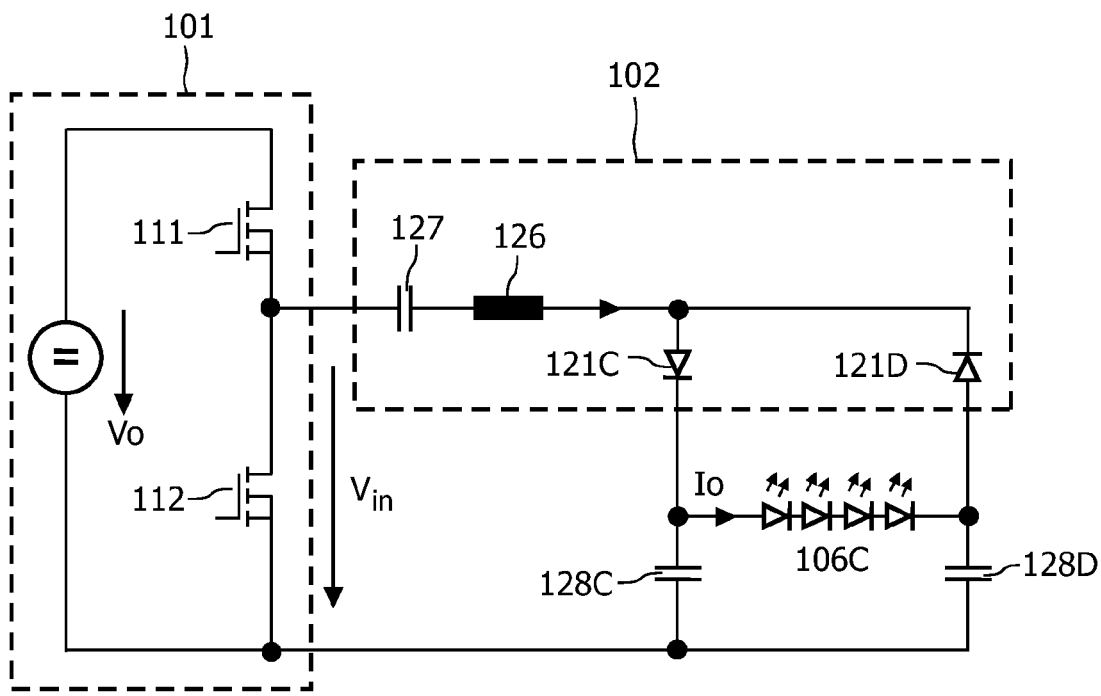
Figure 12:
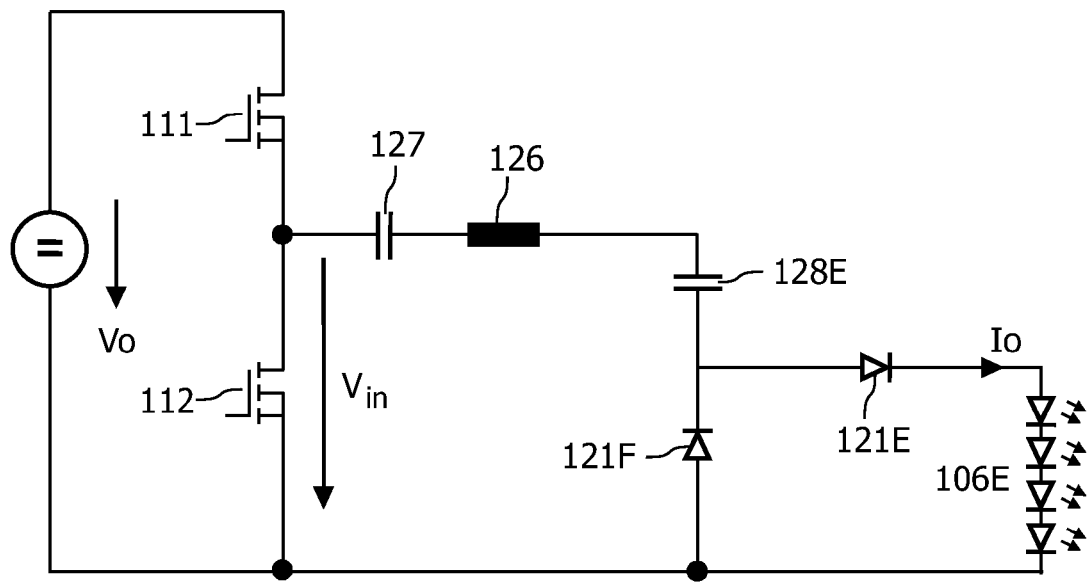
Figure 13:
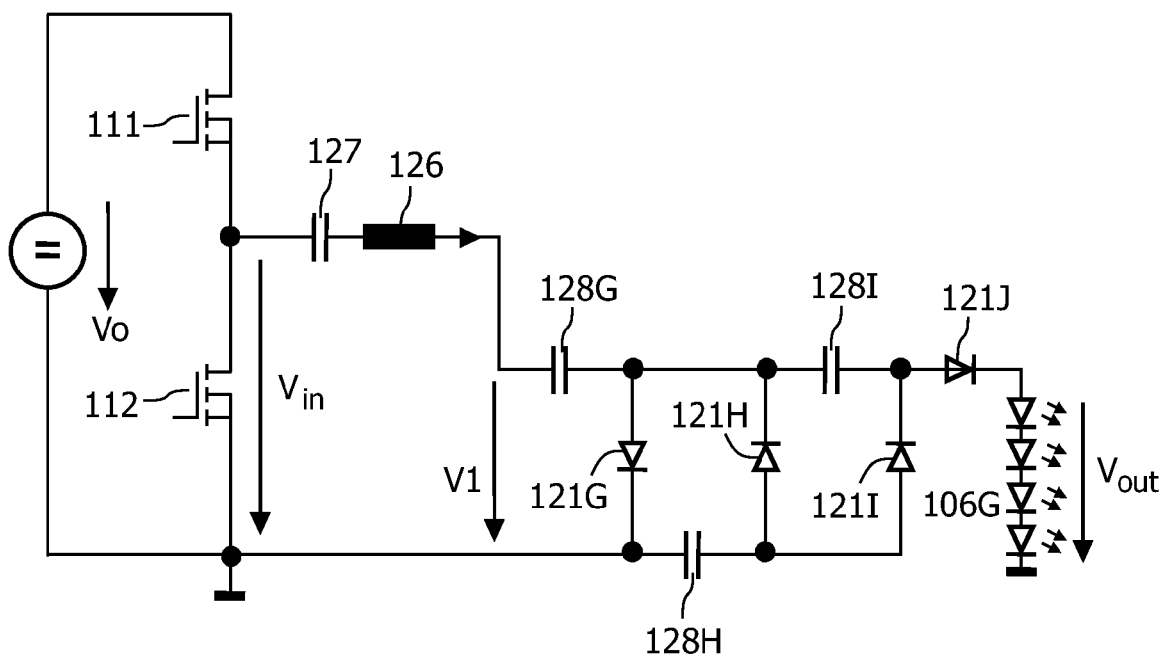
Figure 14:
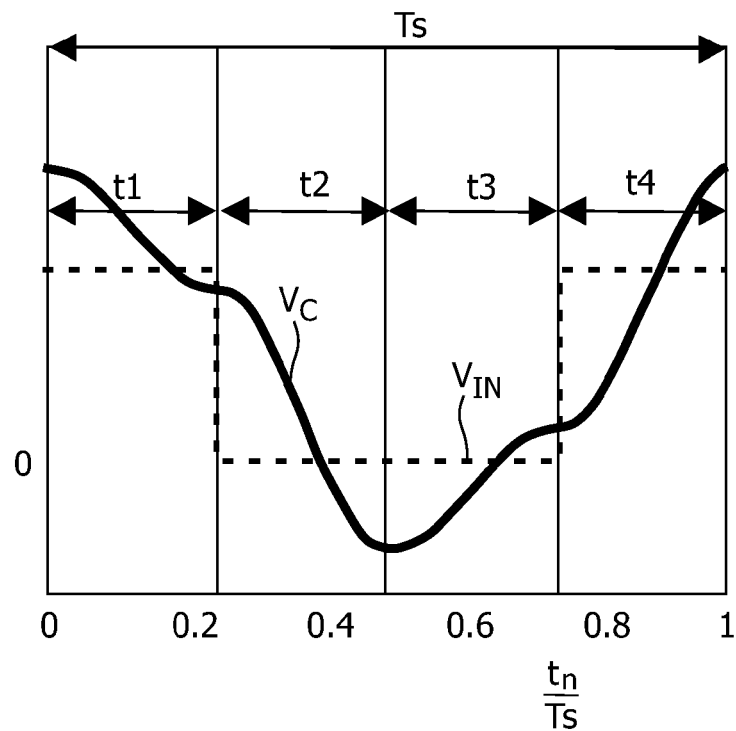
Figure 15:
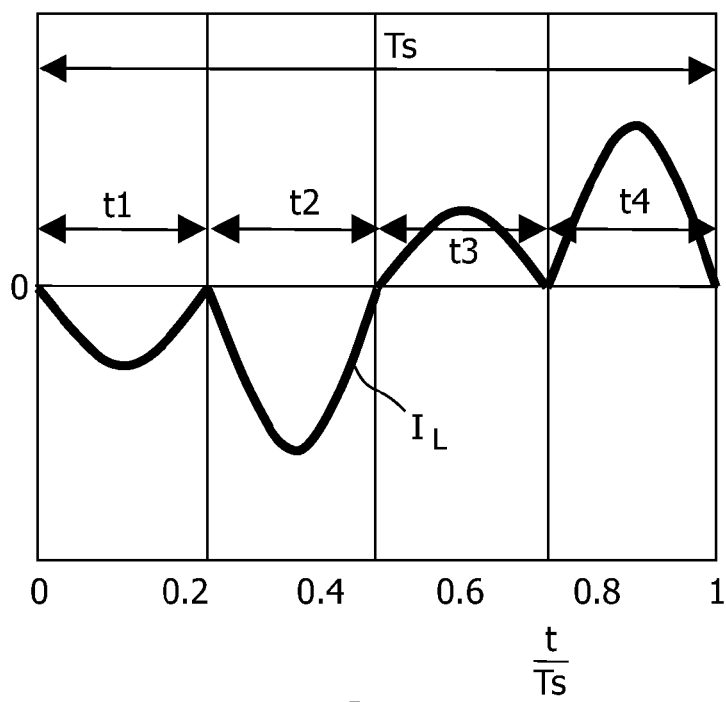
Figure 17A:
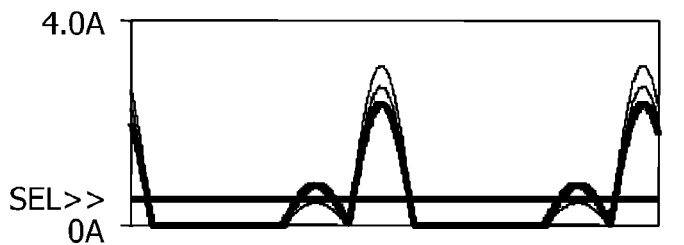
Figure 17B:
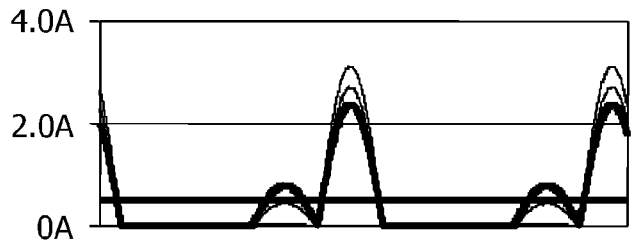
Figure 17C:
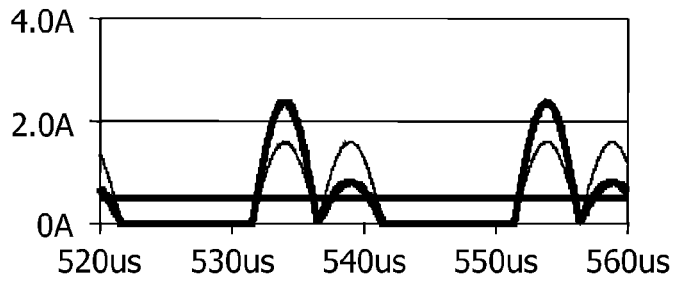
Figure 18A:
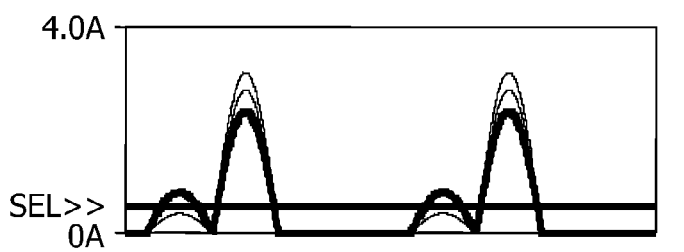
Figure 18B:
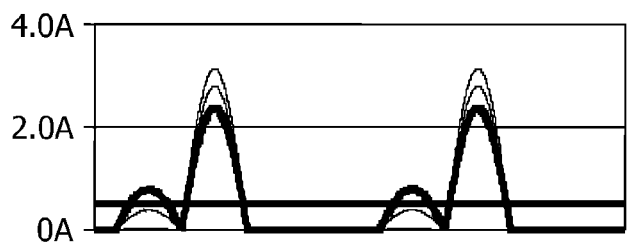
Figure 18C:
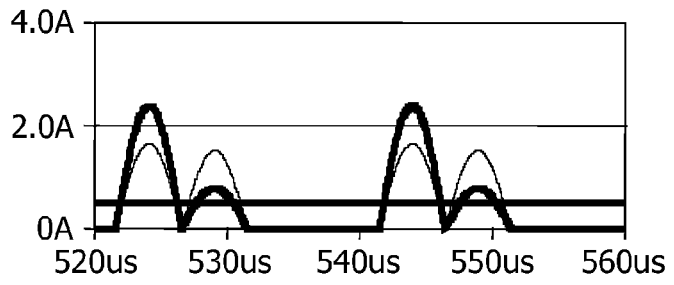
Figure 19:
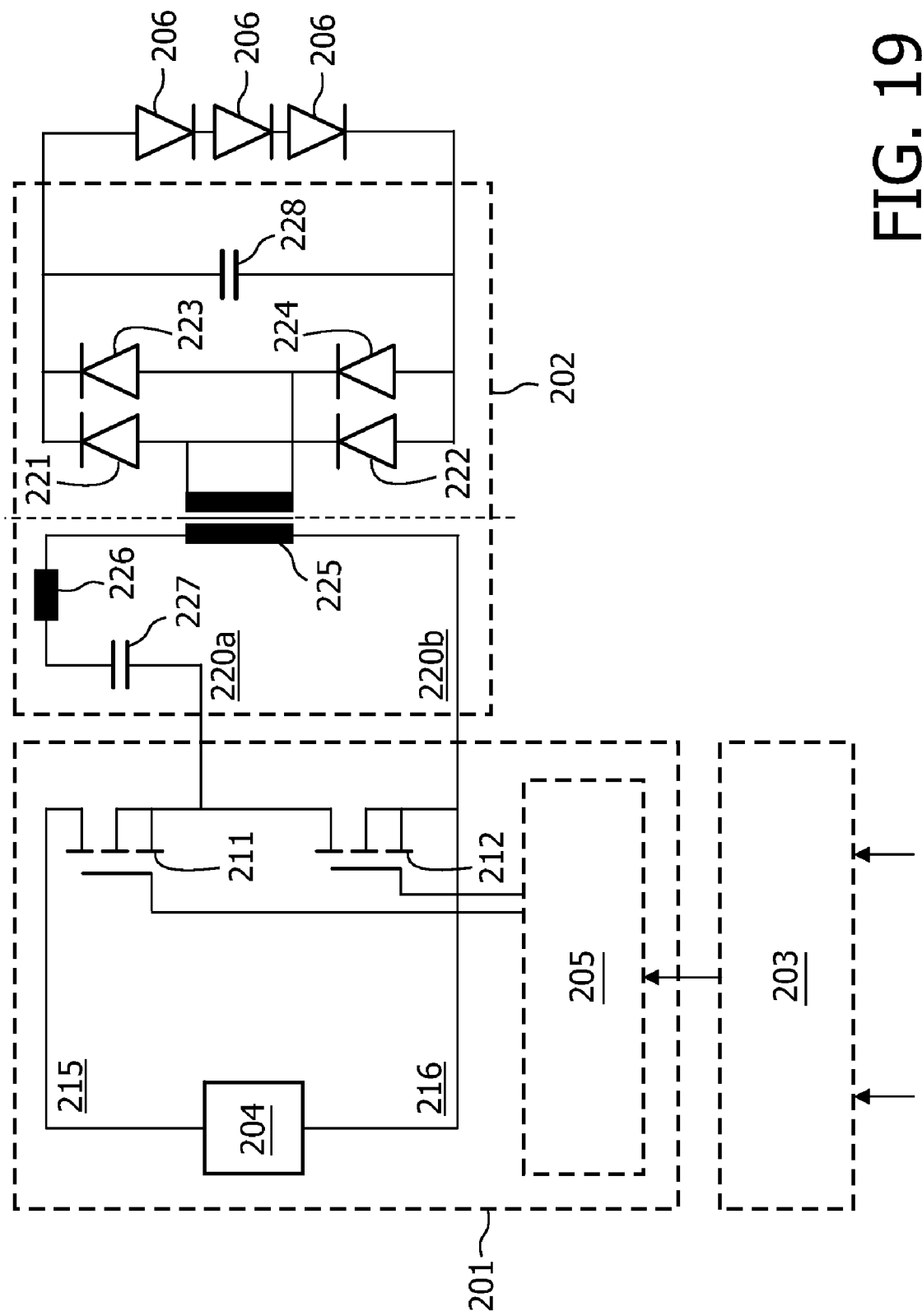
Figure 20:
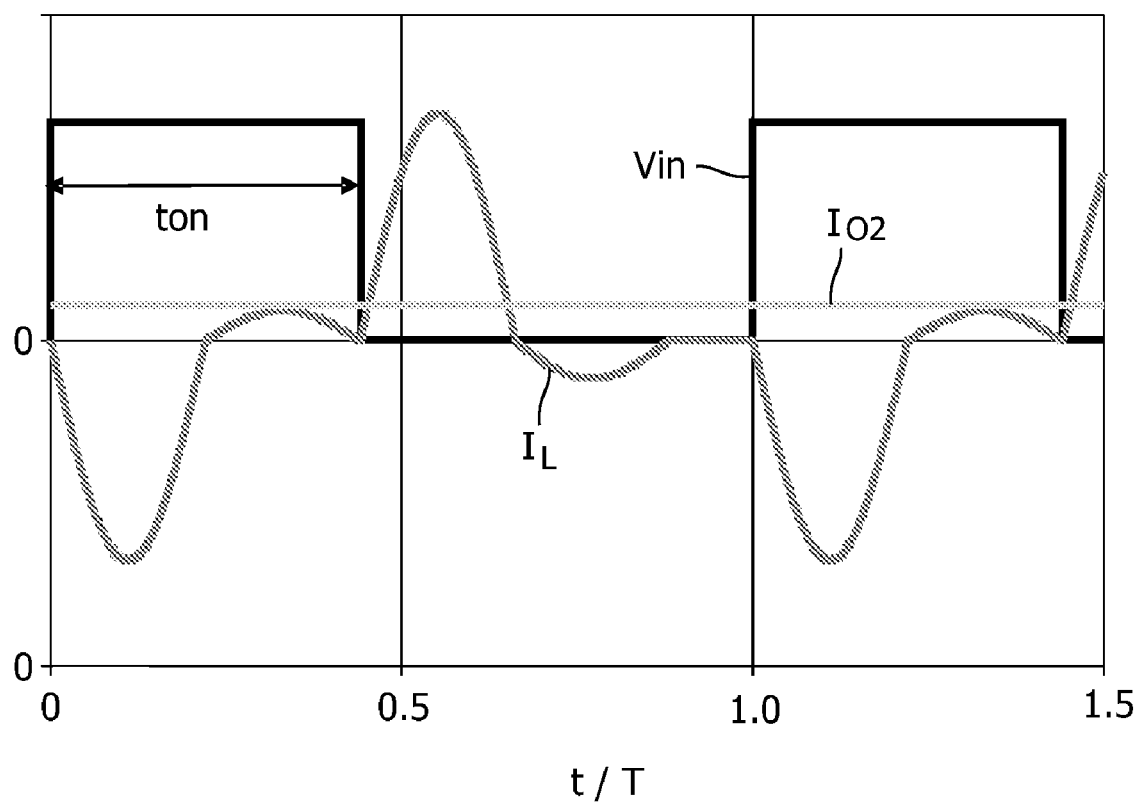

In the drawings:

FIG. 1 shows diagrammatically a supply circuit according to the invention comprising first and second and third circuits, FIG. 2 shows diagrammatically an AC to DC converter, FIG. 3 shows logical circuitry for the first circuit, FIG. 4 shows the third circuit in greater detail, FIG. 5 shows a control signal and a resulting pulse signal, FIG. 6 shows a current through a primary side of a transformer of the second circuit and a voltage across a capacitor of the second circuit as a function of the pulse signal, FIG. 7 shows a current through a secondary side of the transformer of the second circuit and a current through the load as a function of the pulse signal, FIG. 8 shows a device according to the invention, FIG. 9 shows the control signal and individual control signals derived therefrom by the logical circuitry and destined for the individual transistors, FIG. 10 shows diagrammatically another supply circuit according to the invention, FIG. 11 shows diagrammatically another supply circuit according to the invention, FIG. 12 shows diagrammatically another supply circuit according to the invention, FIG. 13 shows diagrammatically another supply circuit according to the invention, FIG. 14 shows a voltage supplied by a first circuit and a voltage across a capacitor as a function of time, FIG. 15 shows a current through an inductor as a function of time, FIG. 16 shows voltages and currents for different situations A-F as a function of time, FIG. 17 shows currents for different situations A-C as a function of time, FIG. 18 shows currents for different situations A-C as a function of time, FIG. 19 shows diagrammatically another supply circuit according to the invention, and FIG. 20 shows currents and voltage for a switching period as a function of time (Ts>4*tau), tau=half resonant period.

The supply circuit 1-3 according to the invention shown in FIG. 1 comprises a first circuit 1 and a second circuit 2 and a third circuit 3. The first circuit 1 comprises a voltage source 4 for generating an input voltage signal Uin via first and second reference terminals 15 and 16. The first circuit 1 further comprises four transistors 11-14. A first transistor 11 has a first main electrode coupled to the first reference terminal 15 and has a second main electrode coupled to a first input 20a of the second circuit 2. A second transistor 12 has a first main electrode coupled to the second main electrode of the first transistor 11 and has a second main electrode coupled to the second reference terminal 16. A third transistor 13 has a first main electrode coupled to the first reference terminal 15 and has a second main electrode coupled to a second input 20b of the second circuit 2. A fourth transistor 14 has a first main electrode coupled to the second main electrode of the third transistor 13 and has a second main electrode coupled to the second reference terminal 16. The first circuit 1 further comprises logical circuitry 5 coupled to the third circuit 3 and to the control electrodes of the transistors 11-14. This logical circuitry 5 will be discussed referring to the FIG. 3.

The second circuit 2 comprises from the input 20a to the input 20b a for example serial resonance circuit of a capacitor 27, an inductance 26 and a primary side of a transformer 25. The inductance 26 is usually at least partly formed by a stray inductance of the transformer 25. The second circuit 2 possibly further comprises four output diodes 21-24 coupled to a secondary side of the transformer 25 and forming a rectifying circuit that is further coupled to a smoothing capacitor 28 and to a load 6 for example comprising three serial light emitting diodes.

The AC to DC converter 4 or voltage source 4 shown in FIG. 2 comprises an AC voltage source 45 coupled to four diodes forming a further rectifying circuit that is further coupled to a further smoothing capacitor 46.

The logical circuitry 5 shown in FIG. 3 comprises a flipflop 51 receiving the control signal s(t) from the third circuit 3. A Q-output of the flipflop is coupled to an AND gate 52 that further receives the control signal s(t) and an inverted Q-output of the flipflop 51 is coupled to an AND gate 53 that further receives the control signal s(t). An output of the AND gate 52 is coupled via a non-inverter 52a to a tdon delay circuit 54a and via an inverter 52b to a tdon delay circuit 54b. An output of the AND gate 53 is coupled via a non-inverter 53a to a tdon delay circuit 55a and via an inverter 53b to a tdon delay circuit 55b. The respective tdon delay circuits 54a and 54b and 55a and 55b are coupled to the control electrodes of the respective transistors 11-14, possibly via a level shifter 56 on behalf of the transistors 11 and 12 and a level shifter 57 on behalf of the transistors 13 and 14.

The third circuit 3 shown in FIG. 4 comprises an input 30a for receiving the input voltage signal Uin (more general: input signal or primary side signal) and comprises an output 30c for supplying the control signal s(t) in dependence of the input voltage signal Uin and independently from the output current signal through the load 6. The third circuit 3 further comprises a further input 30b for receiving a reference current signal, the control signal s(t) further depending on the reference current signal. Thereto, the third circuit 3 comprises a multiplier 31 for multiplying the input voltage signal Uin and the control signal s(t) and comprises a low pass filter 32 for low pass filtering a multiplier output voltage signal and comprises a converter 33 for converting a low pass filter output voltage signal into a low pass filter output current signal and comprises an adder 34 for adding an inverted low pass filter output current signal and the reference current signal. A generator 35-37 comprises a controller 35 for receiving an adder output current signal and comprises a voltage controlled oscillator 36 for receiving a controller output signal and comprises a monoflop 37 for receiving a voltage controlled oscillator output signal and for generating the control signal s(t).

In FIG. 5, the control signal s(t) and a resulting pulse signal U1(t) are shown. The pulse signal U1 has first pulses having a first amplitude+Uin and has second pulses having a second amplitude−Uin different from the first amplitude and has levels having a third amplitude 0 different from the first and second amplitudes. Preferably, the first amplitude is a positive amplitude, the second amplitude is a negative amplitude, and the third amplitude is a substantially zero amplitude.

In FIG. 6, a current I1(t) through a primary side of the transformer 25 of the second circuit 2 and a voltage Uc(t) across the capacitor 27 of the second circuit 2 as a function of the pulse signal U1(t) are shown.

In FIG. 7, a current ID(t) through a secondary side of the transformer 25 of the second circuit 2 (after the rectifier) and a current Iout through the load 6 as a function of the pulse signal U1(t) are shown.

The device 10 according to the invention shown in FIG. 8 comprises the first and second ands third circuits 1-3 and the load 6 and the voltage source 4 this time located outside the first circuit 1.

In FIG. 9, the control signal s(t) and individual control signals f1 (output AND gate 53) and f2 (output AND gate 52) and T1-T4 (outputs tdon delay circuits 54a,54b,55a,55b) derived there from by the logical circuitry 5 and destined for the individual transistors 11-14 are shown.

In general, a galvanic isolating driver topology and a control scheme for Light Emitting Diodes or LEDs have been created. The input voltage Uin can be a non-stabilized DC voltage. The driver consists of a transistor H-bridge 11-14, a controlling third circuit 3 for the H-bridge 11-14, a transformer 25, a series capacitor 27, a diode bridge 21-24 and a smoothing output capacitor 28. At the output, a series connection of LEDs can be supplied.

The transformer 25 serves for galvanic isolation and may adapt the voltage level, e.g. from 300V to 30V. A resonant topology is formed by the stray inductance 26 of the transformer 25 and the series capacitor 27. Thus, the parasitic leakage inductance of the transformer 25 can be part of the driver. Contrary to Pulse Width Modulation based converters such as forward or fly back topologies, here the leakage inductance does not need to be minimized. This is of advantage for the isolation and winding design and it thus keeps the cost low.

The controlling third circuit 3 and the logical circuitry 5 generate alternated positive and negative voltage pulses with a fixed pulse width. Between these voltage pulses the H-bridge 11-14 should stay in a free wheel state for a settable time. Hence, the output is controlled by the repetition frequency. If the resonant frequency of the circuit is properly adapted to the width of the voltage pulse and if the number of LEDs meets the operation voltage range of the circuit, an ideal LED supply driver has been created that shows the following features:

The current in the driver becomes sinusoidal and it is zero at the switching instants. This avoids switching losses and minimizes EMI.

The average current in the LEDs is proportional to the DC input voltage of the driver and to the operating frequency. This means the voltage drops of the LEDs do not affect the current over a large load range. If the product of the DC input voltage times the frequency is kept constant, the average current in the LEDs is constant as well. Moreover the LED current can be varied from a nominal value down to zero.

The LED driver system neither requires sensors nor control units on the secondary (LED) side.

Changes of the LED parameters do not affect the current in the LEDs. This also includes a short circuit of a single LED. The overall voltage drop of all LEDs may vary between 33% to 100%.

The nominal output voltage can be set by the turn ratio of the transformer 25.

The lighting system is very suitable for mains supply.

A dimming function can easily be installed.

The power and control unit can be integrated in a smart power IC.

More in particular, any none stabilized DC voltage Uin can be used to supply the driver. This voltage may be generated from the AC mains by using a further diode bridge 41-44 and a further smoothing capacitor 46. The power part of the driver consists of an H-bridge realized by 4 transistors 11-14. These transistors are controlled by the third circuit 3 via the logical circuitry 5. Voltage level shifters may be used as interfaces between the control electrodes of the transistors 11-14 and the logical circuitry 5.

The output terminals of the H-bridge 11-14 are connected to the primary winding of the transformer 25 via a series capacitor 27. The secondary winding of the transformer 25 feeds the diode bridge 21-24. This diode bridge 21-24 rectifies the AC voltage from the transformer 25 and a smoothing capacitor 28 is used to smooth the output voltage Uout. The series connection of an arbitrary number of LEDs is supplied by the output voltage Uout.

The series capacitor 27 and the stray inductance 26 of the transformer 25 form a series resonant circuit with a resonant frequency $fres=(2\pi)^{-1}(L_{26}C_{27})^{1/2}=(Tres)^{-1}$ and with a resonant impedance $Zres=(L_{26}/C_{27})^{1/2}$. The H-bridge 11-14 generates alternately positive and negative voltage pulses (+Uin or −Uin). The positive voltage pulse occurs if transistor 11 and transistor 14 are in the on state while the negative voltage pulse can be set turning on the transistors 12 and 13. Between the voltage pulses the H-bridge 11-14 provides a free wheel path, which may be performed either by turning on 11 and 13 or by turning on 12 and 14. The time width ton of the positive and negative pulses are preferably set equal to half the resonant period ton=Tres/2, without excluding other settings.

In case the pulse width ton is fixed, the frequency fs can be used as a control parameter. Its maximum value has to be limited to fmax=fres/2>fs. FIG. 5 shows a characteristic output voltage wave of the H-bridge 11-14 as well as a basic switching function s(t) generated inside the controlling third circuit 3.

The nominal output voltage Uout may be determined by the number of LEDs connected in series and their voltage drops. It might stay within the voltage range N2 Uin/(3 N1)<Uout<N2 Uin/N1, whereby N2 represents the secondary windings and N1 represents the primary windings of the transformer 25. If the conditions are fulfilled, two successive sinusoidal half-wave current pulses are drawn from the H-bridge 11-14 for each voltage pulse. The corresponding current I1(t) is presented in FIG. 6 for a certain operation point. Moreover this picture also illustrates the resulting voltage Uc(t) at the series capacitor 27.

Neglecting the magnetization current, the secondary current of the transformer 25 is proportional to the primary current I2=I1 N1/N2. The secondary transformer current I2 is rectified by the diode bridge 21-24, with ID(t)=|I2(t)| shown in FIG. 7. Because of the smoothing capacitor 28 a DC output current is flowing in the load 6 which is equal to the average value of the rectified secondary current Iout=IDrectified.

The output current and thus the LED current is proportional to the frequency and the input voltage: Iout=2 Uin N1 fs/(Zres πN2 fres). Since the input voltage Uin varies with the mains voltage and because of a voltage ripple caused by a small further smoothing capacitor 46, the frequency fs may be adapted in such a way that the product of Uin and fs and thus the output current Iout is kept relatively constant.

This can be achieved by the third circuit 3 without excluding other circuits. In a first step the unsigned voltage pulses to be generated by the switching function s(t) and the input DC voltage Uin are low pass filtered (e.g. by a RC network). The resulting DC voltage is proportional to the voltage frequency product. This voltage is converted into a current via the converter 33 and is compared with a reference current Iref and the difference sets the operating frequency fs via the controller 35. Thereto, the controller 35 controls the voltage controlled oscillator 36 that generates fs and that triggers the monoflop 37 that generates the control signal s(t) with pulses having a pulse width ton etc. Preferably, but not exclusively, ton=1/(2 fres). The turn on delay circuits 54a, 54b, 55a, 55b introduce a time delay tdon for avoiding a short circuit in the H bridge 11-14.

Possible modifications are:

Instead of MOSFETs any other transistor technology may be used.

The smoothing capacitor 28 connected in parallel to the LEDs can be omitted. This has no influence on the average current but it increases the RMS and peak current of the LEDs.

The free-wheel path of the H-bridge 11-14 could always be realized by turning on 12 and 14. In this case the turn on time of the upper transistors 11 and 13 is restricted to the constant pulse width ton which is an advantage.

The series capacitor 27 could also be inserted on the secondary transformer side or series capacitors may be used on both sides.

The input rectifier may be realized by a PFC rectifier circuit.

The driver may be realized without a transformer 25 but with an inductor such as a series choke for forming the resonant topology.

The full bridge output rectifier 21-24 could also be replaced by a combination of split output winding plus only two diodes with the benefit of saving two diodes and having less diode forward conduction losses (but at the price of needing a second winding and perhaps getting asymmetric LED peak currents for the positive and negative transformer input voltage).

This invention might be used for wall flooding, LCD backlighting and general illumination, without excluding other applications with loads in the form of LEDs or in the form of non-LEDs.

The supply circuit according to the invention shown in the FIG. 10 comprises a first circuit 101 comprising a half bridge with a serial transistor circuit of a first transistor 111 and a second transistor 112 coupled to a source Vo and comprises a second circuit 102 comprising a for example serial resonance circuit of a capacitor 127 and an inductor 126. One side of the serial resonance circuit is coupled to a common point of the serial transistor circuit and an other side is coupled to first and second (anti-parallel) branches. The first (second) branch comprises a diode 121A (121B) coupled to a parallel circuit of a capacitor 128A (128B) and for example serially coupled LEDs 106A (106B).

Alternatively, the half bridge may be replaced by for example a full bridge in a half bridge mode. Further alternatively, the inductor 126 may be replaced by a transformer of which a primary side is coupled to the capacitor 127 and of which a secondary side is coupled to the branches.

The supply circuit according to the invention shown in the FIG. 11 comprises a first circuit 101 comprising a half bridge with a serial transistor circuit of a first transistor 111 and a second transistor 112 coupled to a source Vo and comprises a second circuit 102 comprising a for example serial resonance circuit of a capacitor 127 and an inductor 126. One side of the serial resonance circuit is coupled to a common point of the serial transistor circuit and an other side is coupled to first and second (anti-parallel) branches. The first (second) branch comprises a first (second) serial diode-capacitor circuit of a diode 121C (121D) coupled to a capacitor 128C (128D). Common points of the serial diode-capacitor circuits are coupled to each other via for example serially coupled LEDs 106C. This is a voltage doubler with a two-capacitor construction.

The supply circuit according to the invention shown in the FIG. 12 comprises the half bridge with the serial transistor circuit of the first transistor 111 and the second transistor 112 coupled to the source Vo already discussed for the FIGS. 10 and 11 and comprises the for example serial resonance circuit of the capacitor 127 and the inductor 126 already discussed for the FIGS. 10 and 11. One side of the serial resonance circuit is coupled to a capacitor 128E, which is coupled to an anode of a diode 121E and to a cathode of a diode 121F. These diodes 121E-121F are further coupled to for example serially coupled LEDs 106E. This is a voltage doubler with a one-capacitor construction.

The supply circuit according to the invention shown in the FIG. 13 corresponds with the supply circuits shown in the FIGS. 11 and 12 whereby the voltage doubler construction has been replaced by a Cockroft-Walton multiplier construction.

In the FIG. 14, a voltage Vin supplied by a first circuit 101 and a voltage Vc across a capacitor 127 as a function of time are shown, and in the FIG. 15, a current through an inductor 126 as a function of time is shown for a switching period being equal to two times the resonance period of 126, 127. In the FIG. 20 a voltage Vin and a current through an inductor 126 and an averaged current Io1 are shown for a switching period being greater than two times the resonance period of 126, 127.

The topology may be a combination of a half bridge for example driving a series tank and rectifier load branches at or below resonance. Thereby, the topology behaves like a voltage current converter, when for example both the input voltage and the switching frequency are constant then the output current is known, no additional shunts for constant current load driving are required, zero current switching is achieved, a resonant operating mode allows to increase a switching frequency for reducing a volume of passive components, it may work with or without transformer, it has an inherent short circuit protection, it may have integrated magnetics for transformer based solutions whereby a transformer leakage inductance can be used as series tank inductor, it may have a sinusoidal tank current with a low EMI to allow an AC bus, it does not need cross regulation, so i.e. load variation in one output branch does not affect the current in the output, there is an implicit over voltage protection and it may be used to drive a voltage multiplier to increase an output voltage swing without a transformer (important for integration).

In the FIG. 10-15, Vo denotes a DC input voltage, 111 and 112 are for example MosFets of a half bridge, 127 and 126 are for example series resonant tank elements, 121 is an output rectifier diode, 106 is a load string of for example LEDs.

In view of the FIGS. 10, 14 and 15, for a steady state, the response can be subdivided into two states with two subintervals. The two states are defined by 1) 121A is on & 121B is off (State I) and by II) 121A is off and 121B is on (State II). The subintervals 1,2,3,4 as defined in the FIGS. 14 and 15 may be of the same length: t1=t2=t3=t4=τ, where τ denotes a resonance period: τ=π*√(L1*C1). The switching period Ts may be chosen to be 4*τ or greater. Setting up differential network equations for both states, observing continuity and periodicity conditions the relevant currents and voltages can be calculated analytically. Of importance may be the relations for the averaged current over one switching period Ts=1/fs in both load branches for each state: $iav_I=iav_{II}=2/\pi*Vo/Zo*fs/fres$, with Zo=√(L1/C1).

This equation shows, that the averaged output current is proportional to a product of the input dc voltage Vo and the switching frequency fs:

If Vo is constant, the current through the loads is constant as well. Even the load & cross regulation error is zero, which i.e. means that voltage changes on one branch do not affect the current neither of the same nor of the other branch. If the input voltage varies then the switching frequency may be adapted in such a way that the product of Vo and fs and thus the output current is kept relatively constant as well. This is shown in the FIGS. 17 and 18 to be discussed below. So, the for example half-bridge topology behaves like an ideal voltage/current converter. Another important aspect is the peak load current for constant output power. Because the converter oscillates at resonance and the switching period is 4π there are 2 local current peaks in each state:

$ipk1_I=|-0.5*(Vo-Vout1+Vout2)/Zo|$ and $ipk2_I=|-0.5*(Vo+Vout1-Vout2)/Zo|$. It may be desirable to have both peaks balanced, i.e. more or less of the same size so that the peak current stress for a given power (averaged current) is minimum. Observing both expressions for the peak current of the converter according to the invention it can be seen that both values are balanced when the output voltages Vout1, Vout2 are small compared to Vo. This implies the proposed converter is perfectly suited for applications with small supply voltages like high power diodes where only a few LEDs are connected in series.

In the FIG. 16, voltages and currents for different situations A-F as a function of time are shown, for example for Vout<<Vo. A: input voltage full bridge without zero state, B: input voltage half bridge, C: input voltage full bridge with zero state, D: diode current full bridge without zero state, E: diode current half bridge, and F: diode current full bridge with zero state.

In the FIG. 17, currents for different situations A-C as a function of time are shown (cross regulation). The current & averaged current in a branch with a diode for varying an output voltage in a same branch shows that an averaged current is constant. Load parameter is 1d=0,0.5,1 with Vout1=1d*Vout, Vout2=Vout, Vout=48V, Vin=100V.

In the FIG. 18, currents for different situations A-C as a function of time are shown (all in one graph). The current & averaged current in a branch for varying an output voltage in an other branch shows that an averaged current is constant. Parameter is 1d=0,0.5,1 with Vout1=1d*Vout; Vout2=Vout, Vout=48V and Vin=100V.

So, a for example half bridge topology with a for example series resonant tank and for example rectified outputs has been created with for example dual one-way rectification and with for example a capacitor-diode voltage multiplier for example driven at Ts≧4*tau, where tau=pi*sqrt(L*C). Alternatively, a full bridge with variable driving may be introduced so that the full bridge is driven as either a half bridge (on & off time: 2*tau, Ts≧4*tau) or as a full bridge without a free wheel state (on+ and on− time 2*tau, Ts≧4*tau) or as a full bridge with a free wheel state (on+ & on−time=tau, free wheel state=tau following every pulse, Ts≧4*tau). In other words, although not shown in the FIG. 10-13, a third circuit may be used for driving the bridge according to one or more of the four driving schemes as defined above, to reduce a dependency between the input signal and the output signal.

The supply circuit according to the invention shown in the FIG. 19 comprises a first circuit 201 and a second circuit 202 and a third circuit 203. The first circuit 201 comprises a voltage source 204 for generating an input voltage signal Uin via first and second reference terminals 215 and 216. The first circuit 201 further comprises two transistors 211-212. A first transistor 211 has a first main electrode coupled to the first reference terminal 215 and has a second main electrode coupled to a first input 220a of the second circuit 202. A second transistor 212 has a first main electrode coupled to the second main electrode of the first transistor 211 and has a second main electrode coupled to the second reference terminal 216 which is further coupled to a second input 220b of the second circuit 202. The first circuit 201 further comprises logical circuitry 205 coupled to the third circuit 203 and to the control electrodes of the transistors 211-212. This logical circuitry 205 is for example identical to a part of the logical circuitry 5 discussed before. The second circuit 202 is for example identical to the second circuit 2 discussed before.

In the FIG. 20, a voltage Vin and a current through an inductor 126 and an averaged current Io1 are shown for a switching period being greater than two times the resonance period of 126,127. T=switching frequency, ton=Tres where Tres=resonance period.

This FIG. 20 shows a timing for T>2*Tres, where ton=Tres and Toff>Tres. A minimum timing is T=2*Tres, where ton=Tres and Toff=Tres (as shown in FIG. 14-15).

Summarizing, supply circuits 1-3,101-102,201-203 for supplying output current signals to loads 6,106,206 and comprising first circuits 1,101,201 with transistors 11-14,111-112,211-212 for converting input voltage signals into pulse signals and comprising second circuits 2,102,202 with resonance circuits for receiving the pulse signals and for supplying the output current signals to the loads 6,106,206 are provided with third circuits 3,203 for controlling the first circuits 1,101,201, which third circuits 3,203 comprise generators 35-37 for generating control signals for controlling the transistors 11-14,111-112,211-212 for reducing dependencies between the input voltage signals and the output current signals. The third circuits 3,203 supply the control signals in dependence of the input voltage signals and independently from the output current signals. The transistors 11-14,111-112,211-212 may form a full bridge, a full bridge operated in a half bridge mode, or a half bridge.

Terms like "relatively" and "substantially" define maximum deviations of 30%, preferably 20%, further preferably 10%, most preferably 1%. In other words, such terms define intervals of 70-130%, preferably 80-120%, further preferably 90-110%, most preferably 99-101%.

It should be noted that the above-mentioned embodiments illustrate rather than limit the invention, and that those skilled in the art will be able to design many alternative embodiments without departing from the scope of the appended claims. In the claims, any reference signs placed between parentheses shall not be construed as limiting the claim. Use of the verb "to comprise" and its conjugations does not exclude the presence of elements or steps other than those stated in a claim. The article "a" or "an" preceding an element does not exclude the presence of a plurality of such elements. The invention may be implemented by means of hardware comprising several distinct elements, and by means of a suitably programmed computer. In the device claim enumerating several means, several of these means may be embodied by one and the same item of hardware. The mere fact that certain measures are recited in mutually different dependent claims does not indicate that a combination of these measures cannot be used to advantage.

The invention claimed is:

1. A supply circuit for supplying an output signal to a load, the supply circuit comprising:
    a first circuit for converting an input signal having an input voltage level into a pulse signal comprising a series of pulses having a pulse frequency, and wherein the first circuit comprises transistors,
    a second circuit for receiving the pulse signal and for supplying the output signal to the load, wherein the second circuit comprises a resonance circuit, and
    a third circuit for controlling the first circuit, wherein the third circuit comprises a generator for generating a control signal for controlling the transistors for reducing a dependency between the input signal and the output signal,
    wherein the third circuit includes an input for receiving the input signal and includes an output for supplying the control signal in dependence of the input signal and independently from the output signal, and
    wherein the generator generates the control signal such that a product of the input voltage level and the frequency of the pulse signal is kept constant.

2. The supply circuit of claim 1, the third circuit comprising a further input for receiving a reference signal, the control signal further depending on the reference signal.

3. The supply circuit of claim 2, the third circuit comprising:
    a multiplier for multiplying the input signal and the control signal;
    a low pass filter for low pass filtering a multiplier output signal;
    a converter for converting a first low pass filter output signal having a first format into a second low pass filter output signal having a second format; and
    an adder for adding an inverted second low pass filter output signal and the reference signal,
    wherein the generator comprises:
        a controller for receiving an adder output signal;
        a voltage controlled oscillator for receiving a controller output signal; and
        a monoflop for receiving a voltage controlled oscillator output signal and for generating the control signal.

4. The supply circuit of claim 1, wherein the pulses include first pulses having a first amplitude and further include second pulses having a second amplitude different from the first amplitude and wherein the pulse signal includes levels having a third amplitude different from the first and second amplitudes.

5. The supply circuit of claim 1, wherein the pulses include first pulses having a first amplitude and further include second pulses having a second amplitude different from the first amplitude.

6. The supply circuit of claim 5, wherein the pulses include third pulses having a fourth amplitude and wherein the pulse signal includes a level having a fifth amplitude.

7. The supply circuit of claim 1, the resonance circuit comprising a transformer and a capacitor coupled serially to a primary side of the transformer or to a secondary side of the transformer.

8. The supply circuit of claim 1, the resonance circuit comprising an inductor and a capacitor coupled serially to a first side of the inductor or to a second side of the inductor.

9. The supply circuit of claim 1, the load comprising one or more light emitting diodes.

10. The supply circuit of claim 1, comprising one or more input diodes for rectifying an AC signal, the input signal comprising a rectified AC signal.

11. The supply circuit of claim 1, wherein the pulses have a pulse width substantially equal to half a resonant period of the resonance circuit.

12. The supply circuit of claim 1, wherein the pulse frequency is substantially equal to or less than half a resonant frequency of the resonance circuit.

13. The supply circuit of claim 1, wherein the pulses have a pulse width substantially equal to a resonant period of the resonance circuit.

14. The supply circuit of claim 1, wherein the pulses have a pulse frequency substantially equal to or smaller than a resonant frequency of the resonance circuit.

15. A device comprising the supply circuit of claim 1 and further comprising the load.

16. A method for supplying an output signal to a load, the method comprising:
    converting an input signal having an input voltage level into a pulse signal via a first circuit, wherein the pulse signal comprises a series of pulses having a pulse frequency, and wherein the first circuit comprises transistors,
    receiving the pulse signal and supplying the output signal to the load via a second circuit, which second circuit comprises a resonance circuit, and
    controlling the first circuit via a third circuit, which third circuit comprises a generator for generating a control signal for controlling the transistors for reducing a dependency between the input signal and the output signal, wherein the control signal is dependent on the input signal and independent from the output signal, and wherein the generator generates the control signal such that a product of the input voltage level and the frequency of the pulse signal is kept constant.

17. A tangible medium having stored thereon computer programming instructions for performing the method of claim 16.

* * * * *